United States Patent [19]

Frushour

[11] Patent Number: 4,828,582

[45] Date of Patent: * May 9, 1989

[54] POLYCRYSTALLINE ABRASIVE GRIT

[75] Inventor: Robert H. Frushour, Ann Arbor, Mich.

[73] Assignee: General Electric Company, Worthington, Ohio

[ * ] Notice: The portion of the term of this patent subsequent to Oct. 11, 2005 has been disclaimed.

[21] Appl. No.: 153,466

[22] Filed: Feb. 3, 1988

Related U.S. Application Data

[63] Continuation of Ser. No. 793,462, Oct. 29, 1985, abandoned, which is a continuation of Ser. No. 581,290, Feb. 17, 1984, abandoned, which is a continuation-in-part of Ser. No. 527,403, Aug. 29, 1983, abandoned.

[51] Int. Cl.$^4$ .............................................. B24D 3/00
[52] U.S. Cl. ...................................... 51/293; 51/298; 51/308; 51/309
[58] Field of Search .................. 51/293, 298, 308, 309

[56] References Cited

U.S. PATENT DOCUMENTS

| | | | |
|---|---|---|---|
| 2,077,345 | 4/1937 | Van der Pyl | 51/309 |
| 2,137,200 | 11/1938 | Boyer | 51/209 R |
| 2,137,201 | 11/1938 | Boyer | 75/243 |
| 2,173,833 | 9/1939 | Fitz-Randolph | 75/243 |
| 2,238,351 | 4/1941 | Van der Pyl | 428/564 |
| 2,270,209 | 1/1942 | Van der Pyl | 428/564 |
| 2,561,709 | 7/1951 | Norling | 75/243 |
| 2,828,197 | 3/1958 | Blackmer, Jr. | 428/568 |
| 3,087,803 | 4/1963 | Bakian | 51/298 |
| 3,141,746 | 7/1964 | De Lai | 51/307 |
| 3,369,879 | 2/1968 | Miller | 51/309 |
| 3,609,818 | 10/1971 | Wentorf, Jr. | 425/77 |
| 3,637,360 | 1/1972 | Ueltz et al. | 51/293 |
| 3,645,706 | 2/1972 | Bovenkerk et al. | 51/295 |
| 3,743,489 | 7/1973 | Wentorf, Jr. et al. | 51/307 |
| 3,745,623 | 7/1973 | Wentorf, Jr. et al. | 51/307 |
| 3,767,371 | 10/1973 | Wentorf, Jr. et al. | 51/307 |
| 3,902,873 | 9/1975 | Hughes | 51/298 |
| 3,904,391 | 9/1975 | Lindstrom et al. | 51/295 |
| 3,913,280 | 10/1975 | Hall | 51/307 |
| 4,041,650 | 8/1977 | Sawluk | 51/206 R |
| 4,104,344 | 8/1978 | Pope et al. | 264/42 |
| 4,224,380 | 9/1980 | Bovenkerk et al. | 51/307 |
| 4,278,448 | 7/1981 | Ishizuka et al. | 51/295 |
| 4,378,233 | 3/1983 | Carver | 51/298 |
| 4,481,016 | 11/1984 | Campbell et al. | 51/295 |

*Primary Examiner*—A. Lionel Clingman
*Assistant Examiner*—Willie J. Thompson
*Attorney, Agent, or Firm*—Gary L. Loser

[57] ABSTRACT

Diamond or CBN polycrystalline abrasive grit useful in tools for grinding or cutting is made by size reducing and leaching non-diamond or non-CBN material from a compact to provide polycrystalline abrasive grit having a selected and having a network of inter-connected, empty pores dispersed throughout.

7 Claims, No Drawings

POLYCRYSTALLINE ABRASIVE GRIT

CROSS-REFERENCE TO RELATED APPLICATION

This is a continuation of United States patent application Ser. No. 793,462, filed Oct. 29, 1985, which is a continuation of application Ser. No. 581,290, filed Feb. 17, 1984, which is a continuation-in-part of application Ser. No. 527,403, filed Aug. 29, 1983 all abandoned.

BACKGROUND OF THE INVENTION

The present invention relates to polycrystalline abrasive grit, to a method for making the abrasive grit and to tools having a cutting or abrading surface wherein the abrasive grit is held in a binder. A tool of the present invention may be a drill bit or dressing tool or an impregnated tool such as a grinding wheel, saw, honing stone or the like.

Methods and apparatus for making polycrystalline diamond or cubic boron nitride (CBN) compacts are well known. For example, methods for making diamond compacts are taught in U.S. Pat. No. 3,141,746, July 21, 1964 to DeLai, and in later U.S. Pat. Nos. 3,609,818, Oct. 5, 1971, and 3,745,623, July 17, 1973, both to Wentorf, Jr., et al, and 4,224,380, Sept. 23, 1980 to Bovenkerk, et al. A method for making a CBN compact is taught in U.S. Pat. No. 3,767,371, Oct. 23, 1973 to Wentorf, Jr., et al.

Generally speaking, polycrystalline diamond or CBN compacts are made by high-pressure, high-temperature processing wherein diamond or CBN particles are compressed and heated in the presence of a metallic catalyst or sintering aid material. Under the proper pressure and temperature conditions, diamond to diamond or CBN to CBN bonds are catalyzed to bond the diamond or CBN particles together in a polycrystalline compact. The resulting polycrystalline compact can then be used as an abrasive tool or can be subjected to still further process steps.

One further process step involves leaching non-diamond or CBN material from the compact. For example, U.S. Pat. Nos. 4,224,380, Sept. 23, 1980 to Bovenkerk, et al, and 4,104,344 to Pope, et al, teach chemically leaching non-diamond material such as sintering aid or catalytic material to provide a polycrystalline compact consisting essentially of self-bonded, abrasive particles with a network of inter-connected, empty pores dispersed throughout.

In accordance with the present invention, a polycrystalline diamond or CBN compact is subjected to leaching and size reduction steps to provide polycrystalline abrasive grit having substantially uniform physical properties; for example, abrasion resistance and fracture toughness properties. Thus, the present invention facilitates production of tools with abrasive grit of substantially uniform, consistent physical properties. The present invention also facilitates the selection of abrasive grit having the specific physical properties desired for a specific use. Weak polycrystalline grit particles are separated from stronger polycrystalline grit during the process of this invention. Furthermore, each polycrystalline grit comprises a plurality of self-bonded randomly oriented crystals. Hence, the polycrystalline grit can be employed in a tool having consistent strength and hardness characteristics. A tool of the present invention is an improved tool enjoying advantages of improved mechanical bond strength between the grit particles and the binder which can be a resin, metal, plated or vitreous binder. Further understanding of the present invention will be obtained from the following disclosure.

SUMMARY OF THE INVENTION

Abrasive grit of the present invention comprises polycrystalline, self-bonded diamond or cubic boron nitride abrasive grit having a selected size. The abrasive grit is further characterized by having a network of inter-connected, empty pores dispersed throughout each grit particle, said pores comprising between about 1% and about 30% by volume of the grit particles. The abrasive grit of the present invention has a selected size within the range of from 1 micron in diameter to 1 cm. in weight and is made by the process of:

(1) Providing a polycrystalline compact having a size substantially greater than said selected size and comprising self-bonded abrasive particles selected from the group consisting of diamond and cubic boron nitride particles;

(2) Size reducing said compact to pieces having said selected size; and (3) Leaching non-particulate matter from said pieces to provide said abrasive grit.

Optionally and preferably, an additional step of shaping the pieces to provide grit having a desirable blocky shape thereto is carried out. Also optionally and preferably, an additional step of sizing the pieces or grit is carried out to obtain grit further classified according to size to thereby provide selected sized grit for specific uses.

A tool of the present invention comprises a binding medium having imbedded therein abrasive grit made in accordance with the present invention.

DESCRIPTION OF THE PREFERRED EMBODIMENTS

In accordance with the present invention, polycrystalline abrasive grit useful in tools for grinding, honing, sawing, cutting, polishing and the like is provided from a starting material which is a conventional polycrystalline diamond or CBN compact. Suitable polycrystalline compacts are well-known in the art and are taught, for example, in the aforementioned U.S. Pat. Nos. 3,141,746; 3,609,818; 3,745,623; 4,224,380; 3,767,371; 4,224,380; and 4,104,344, each of which is specifically incorporated by reference herein. As taught in U.S. Pat. No. 4,224,380, Sept. 23, 1980 to Bovenkerk, et al, a polycrystalline compact is generally made by the steps of:

(a) Placing within a reaction cell or charge assembly a mass of abrasive particles selected from the group consisting of diamond particles and CBN particles having a size of from about 0.1 to about 1,000 micrometers and a mass of material which is active as a sintering aid for the selected abrasive particle mass;

(b) Simultaneously subjecting the cell and the contents thereof to temperatures in the range of 1,200° C. to 2,000° C. and pressures in excess of 40 kbars;

(c) Ceasing the input of heat to the cell;

(d) Removing the pressure applied to the cell; and (e) Removing from the cell an abrasive body formed by steps (a) to (d) and which is comprised of the particles in a self-bonded form with a metallic phase comprised of a sintering aid material infiltrated throughout the abrasive body.

In short, diamond or CBN compacts are prepared by HP/HT processing wherein hot compressed diamond particles are infiltrated with a catalytic material by axial or radial sweep-through of the material through the diamond particles. During sweep-through, catalyzed sintering of the diamond particles occurs leading to extensive diamond-to-diamond bonding. Suitable catalytic metals as well as apparatus for carrying out the method are well known in the art and are taught in the above-referenced patents.

In accordance with the present invention, a polycrystalline compact having a size substantially greater than that of the desired abrasive grit is subjected to size reduction and leaching steps. Preferably additional steps of shaping, cleaning and sizing are also carried out. The resulting product is a polycrystalline abrasive grit having a selected size which can be incorporated in an abrasive tool in a conventional manner to provide an improved abrasive tool. The grit is suitable for incorporation in a binder for use in an abrasive tool.

During the size reduction step of the present invention, a polycrystalline compact is subjected to high, repeated impact and grinding to reduce the size of the compact to pieces having the desired selected size. The selected size of pieces ranges broadly from about 1 micron in diameter up to about 10 cm. It will be appreciated that it is conventional in the art to size diamond pieces by diameter in microns up to 1000 microns and then by pieces per carat up to 1 carat and then by carats per piece. A piece 1 cm. in length would be larger than 10 carats. The preferred size depends upon the specific use for the tool incorporating the abrasive grit.

Size reduction can be accomplished using conventional apparatus such as a conventional milling apparatus. Preferably the size reduction step is carried out by initially reducing the size of the compact by impact and grinding in, for example, a mortar and pestle-type device followed by a final size reduction in a high-energy, impact mill such as the Vortec Model M-1 Diamond Impact Mill operating at 1,250 to 1,500 rpm. The size reduction process may be repeated until pieces of the desired selected size are achieved.

After size reduction, the pieces are optionally and preferably processed to achieve a "blocky" shape. Generally speaking, for most uses an aspect ratio of less than 2 to 1, preferably less than 1.5 to 1, will be desired. By the term "aspect ratio" is meant the ratio of the longest dimension of the piece to the shortest dimension of the same piece. "Blocking" is conventional in the abrasive art and can be accomplished by use of a ball mill, mortar and pestle, or a jet mill such as a 4-inch float energy micro-jet jet mill system. For example, the pieces can be placed in a stainless steel mill ⅓ full of 3/8-inch carbide balls filled with water and milled for 4-6 hours at 100 rpm, or the pieces can be placed in a mortar and ground with a pestle to the desired shape, or the pieces can be processed through a high-energy jet mill at 10 grams per minute feed rate.

During the leaching steps of the present invention, non-diamond material in the case of a polycrystalline diamond compact, or non-CBN material in the case of a CBN compact is substantially removed from the compact or pieces thereof to provide pieces each having a network of inter-connected, empty pores dispersed throughout and defined by the crystals and remaining metallic phase comprising the piece. Both U.S. Pat. No. 4,224,380, Sept. 23, 1980 to Bovenkerk, et al, and 4,104,344, Aug. 1, 1978 to Pope, et al teach methods by which leaching can be carried out. Thus, leaching can be carried out by immersion of the pieces of compact in acid, or by liquid zinc extraction, electrolytic depleting or any other suitable process leaving pieces in self-bonded form with a network of pores throughout. Chemical leaching can be carried out, for example, by placing the pieces in hot perchloric acid, hydrofluoric acid, nitric acid, hydrochloric acid or suitable mixtures thereof. As taught in the Bovenkerk, et al patent, the pores comprise from about 5% to about 30% by volume of the compact of Bovernkerk, et al. However, for use herein, leaching can be carried out to provide pores comprising a broader range of from about 1% to about 30% by volume of the piece.

The steps of size reduction and leaching can be carried out in any order; however, it is preferable to carry out the size reduction step first and then carry out the leaching step since leaching will be facilitated by the smaller pieces. Also, the pieces will be simultaneously cleaned during the leaching step. If the compact is subjected to leaching and then size reduction, it will normally be desirable to clean the pieces with a suitable acid solution followed by rinsing with deionized water and drying. Suitable acid solutions are well known in the art and include solutions of sulfuric acid, nitric acid, hydrochloric acid and hydrofluoric acid.

It may be desirable for many uses to have abrasive grit of a selected specific size range within the broad range of from about 1 micron in diameter up to about 1 cm. Sizing can be accomplished in any suitable manner. For example, for selected smaller sizes, one can employ sieving using selected matched U.S. Standard wire mesh sieves of the following sizes: Nos. 20, 25, 30, 35, 40, 45, 50, 60, 70, 80, 100, 120, 140, 170, 200, 230, 270, 325 and 400, using a 100 gram ±5 gram sieve load and a Tyler Rotap for 15 minutes. For larger sizes, one can hand select grit within a desired selected size range. Sizing accuracy can be determined by testing in accordance with ANSI Standard B74.16-1971. It will, of course, be appreciated that grit of a particular selected size and a particular selected strength may be preferable for a specific use or in a particular tool. Larger size grit of 18/20 mesh size, i.e., grit which will pass through an 18 mesh sieve but not a 20 mesh sieve, will be especially useful in saw blades and core drills. This grit will desirably also be strong and blocky. Small grit of 325/400 mesh size, if strong, will be especially suitable in metal bonded grinding wheels for grinding ceramic or glass. Weaker grit of 325/400 mesh size will be especially suitable in resin bonded grinding wheels for grinding tungsten carbide. Grit of a size of from 12 pieces per carat up to 1 carat per piece can be desirably used in surface set mining bits.

A tool of this invention comprises the desired size polycrystalline grit of the present invention in a suitable bonding medium. The grit may be embedded in and bonded to the medium in any conventional manner and, of course, the grit may be metal clad or coated, if desired, for example, for use in a resin bonded wheel. Tools having diamonds or other particulate abrasives held in place by a vitreous, metallic, plated or resin binding agent are well known as are various methods of making them. Examples of such tools which can incorporate the abrasive particles of the present invention are disclosed in U.S. Pat. Nos. 2,077,345, Apr. 13, 1937 to Van der Pyl; 2,137,200, Nov. 15, 1938 to Boyer; 2,137,201, Nov. 15, 1938 to Boyer; 2,173,833, Sept. 26, 1939 to Fitz-Randolph; 2,238,351, Apr. 15, 1941 to Van der Pyl; 2,270,209, Jan. 13, 1942 to Van der Pyl; 2,561,709 to Nowling; 3,904,391, Sept. 9, 1975 to Lindstrom, et al; 2,828,197, Mar. 25, 1958 to Blackmer; 3,087,803, Apr. 30, 1963 to Bakian; 3,369,879, Feb. 20, 1968 to Miller; 3,902,873, Sept. 2, 1975 to Hughes; 3,645,706, Feb. 29, 1972 to Bovenkerk, et al, the disclosures of which are incorporated by reference herein. The abrasive grit of the present invention has a porous structure and, being polycrystalline, presents a plurality of faces and angles. Thus, an abrasive tool of the present invention has good mechanical bond strength between the abrasive grit and binding medium. In addition, each abrasive grit comprises a plurality of randomly oriented crystals. Thus, the orientation of each abrasive grit in the binder will not substantially effect the abrasion resistance or fracture toughness properties of the grit in use. In short, a high percent of working grit will be obtained.

The strength of the abrasive material can be well controlled in accordance with the process of this invention. The process parameters employed in making the polycrystalline compact can be selected to provide desired bond strength, from weak to strong, between crystals. The size reduction and optional sizing steps of the present invention can then be employed to selectively obtain the stronger or weaker polycrystalline pieces from the compact. Weak polycrystalline material breaks up during the size reduction step and can be separated during the sizing step. Also, as size reduction inherently reduces weak bonds by breaking them and thus size reduction tends to provide smaller, stronger polycrystalline pieces. It will be appreciated that for some uses strong grit will be desired, while for other uses weaker or more friable grit will be desired. Thus, not only can abrasive grit particles of uniform size and strength be obtained in accordance with the present invention, but the desired size and strength can be controlled. Thus, particular grit best adapted for a particular use or tool can be employed to provide an improved tool.

A further understanding of the present invention can be obtained from the following examples.

EXAMPLE 1

A diamond compact is made in accordance with sample B-4 of Example 1 of U.S. Pat. No. 4,224,380. The disc-shaped diamond compact is then subjected to high, repeated impact and grinding in a mortar and pestle device to obtain an initial reduction in size and is then subjected to further size reduction in a Vortec Model M-1 Diamond Impact Mill operating at 1,250 to 1,500 rpm until the size of the pieces is in the 10/15 mesh range (U.S. Standard wire mesh sieve). The pieces are then further processed by passing them through a 4-inch fluid-energy Micro-jet jet mill at a feed rate of about 10 grams per minute to round off sharp corners (blocking) and to further reduce the size of the pieces. After jet milling, the pieces are sieved to obtain size distributions through the following matched wire mesh sieves:

| |
|---|
| #16 |
| #18 |
| #20 |
| #25 |
| #30 |
| pan |

The 18/20 mesh product is removed for use as 18/20. The greater than mesh 16 and 16/18 pieces are reprocessed through the jet mill and sieved to obtain additional 18/20 pieces.

The 18/20 mesh pieces are then cleaned in acid baths to remove milling contamination as follows. The 18/20 pieces are soaked in each bath for 2 hours at 375° F. and then allowed to cool to room temperature and rinsed with deionized water between acid baths. Bath 1 contains concentrated technical grade sulfuric acid and nitric acid in a 10:1 volume ratio. Bath 2 contains hydrochloric acid and nitric acid in a volume ratio of 2:1, and Bath 3 contains nitric acid and hydrofluoric acid in a volume ratio of 1:1. Finally the pieces are rinsed with deionized water and dried at 350° F. for 1 hour.

The cleaned pieces are then used as abrasive grit in a conventional saw blade.

EXAMPLE 2

The process of Example 1 is carried out except that the discs are initially broken into pieces of 30/45 mesh range and are then processed through the jet mill as described above until the size of 50/60 mesh is obtained.

After each jet milling operation, sieving is performed on the following matched wire mesh sieves:

| |
|---|
| #40 |
| #45 |
| #50 |
| #60 |
| #70 |
| #80 |
| pan |

The 50/60 mesh pieces are then cleaned as in Example 1 in acid baths to remove milling contamination and then used as abrasive grit in a conventional metal bonding grinding wheel.

EXAMPLE 3

The residue from Example 1, i.e., the pieces of less than 20 mesh size, and the residue from Example 2, i.e., the pieces of less than 60 mesh size, are processed in an M-1 Vortec mill to reduce the size to approximately 170/200 mesh (110 to 90 microns). This feed stock is then processed through a jet mill to further reduce the size and shape the pieces. After each processing, the pieces are sieved in the following matched wire mesh sieves:

| |
|---|
| #200 |
| #230 |
| #270 |
| #325 |
| #400 |
| pan |

The 230/270 is removed and the pieces of greater than 200 mesh size is then reprocessed through the jet mill to produce an additional 230/270 cut. The process is repeated until the feed stock of greater than 200 mesh size is eliminated. The 230/270 grit is then cleaned in acid baths as in Example 1 to remove milling contamination and is then used as abrasive grit in a metal-bonded grinding wheel.

EXAMPLE 4

A polycrystalline diamond compact is made in accordance with Example 1 of U.S. Pat. No. 3,609,818. The thin layer of zirconium remaining on the compact is ground off and then the compact is subjected to high, repeated impact and grinding in a mortar and pestle device to obtain an initial reduction in size and is then subjected to further size reduction in a Vortec Model M-1 Diamond Impact Mill operating at 1,250 to 1,500 rpm until the size of the pieces are in the 10/15 mesh range (U.S. Standard wire mesh sieve). The pieces are then further processed by passing them through a 4-inch fluid-energy Micro-jet jet mill at a feed rate of about 10 grams per minute to found off sharp corners (blocking) and to further reduce the size of the pieces. After jet milling, the pieces are sieved to obtain size distributions through the following matched wire mesh sieves:

|  |
|---|
| #16 |
| #18 |
| #20 |
| #25 |
| #30 |
| pan |

The 18/20 mesh product is removed for use as 18/20. The greater than mesh 16 and 16/18 pieces are reprocessed through the jet mill and sieved to obtain additional 18/20 pieces.

The 18/20 pieces are then subjected to chemical leaching by immersing the pieces in a solution of concentrated nitric and hydrochloric acid (in a 1 to 1 volume ratio) at 212° F. for 4 hours. The solution is then allowed to cool to room temperature and then decanted. The leaching procedure is repeated 5 times.

Finally, the 18/20 pieces are rinsed with deionized water and dried at 350° F. for 1 hour. The 18/20 pieces are then used as abrasive grit in a conventional core drill wheel.

EXAMPLE 5

A diamond compact is made in accordance with sample B-4 of Example 1 of U.S. Pat. No. 4,224,380. The disc shaped compact is then broken in a mortar and pestle device to obtain pieces generally larger than 1 carat in size. The pieces are then subjected to acid baths as in Example 1. Then the pieces are passed through a 4-inch fluid-energy Micro-jet jet mill at a feed rate of about 10 grams per minute to round off sharp corners (blocking) and to further reduce the size of the pieces. The pieces are again subjected to acid baths as in Example 1. The pieces are then sized by rough screening with a No. 16 wire mesh sieve and the greater than mesh 16 pieces are placed on a shaker table. The table top of the shaker table oscillates and is angled from the horizontal to separate the blocky pieces from the flats in a conventional manner. Then the blocky pieces are selected to obtain pieces having a size of from 12 pieces per carat to 1 carat per piece. An 8-inch diameter surface set mining bit is made by bonding as abrasive grit therein, 1750 of the blocky pieces each having a size of about 5 pieces per carat.

What is claimed is:

1. The method of making abrasive grit having a selected size within the range of from about 1 micron to about 1 cm. in diameter, said method comprising the steps of:
   (a) providing a polycrystalline compact substantially greater than said selected size and comprising self-bonded, abrasive particles selected from the group consisting of diamond and cubic boron nitride particles;
   (b) size reducing said compact by milling said compact into pieces having said selected size; and
   (c) leaching non-particle matter from said pieces.

2. The method of claim 1 wherein said grit is subjected to a blocking step and has an aspect ratio of less than 2 to 1.

3. The method of claim 2 wherein said particles of step (b) are subjected to a sizing step.

4. The method of claim 2 wherein said particles comprise diamond.

5. The method of claim 2 wherein step (b) is carried out before step (c).

6. The method of claim 2 wherein said compact is subjected to leaching before step (b).

7. The method of claim 2 wherein following step (c), said particles are bonded to a tool.

* * * * *